United States Patent
Kollah et al.

(10) Patent No.: US 6,190,524 B1
(45) Date of Patent: Feb. 20, 2001

(54) ORGANOSULFUR BISMUTH COMPOUNDS AND THEIR USE IN ELECTRODEPOSITABLE COATING COMPOSITIONS

(75) Inventors: Raphael O. Kollah, Pittsburgh; Brian E. Woodworth, Mars; Lawrence G. Anderson; Matthew S. Scott, both of Pittsburgh, all of PA (US)

(73) Assignee: PPG Industries Ohio, Inc., Cleveland, OH (US)

( * ) Notice: Under 35 U.S.C. 154(b), the term of this patent shall be extended for 0 days.

(21) Appl. No.: 09/277,445

(22) Filed: Mar. 26, 1999

(51) Int. Cl.$^7$ .................................................. C25D 13/10
(52) U.S. Cl. ..................... 204/489; 204/500; 204/505; 524/415
(58) Field of Search ............................ 204/489, 500, 204/505; 524/415

(56) References Cited

U.S. PATENT DOCUMENTS

| | | | |
|---|---|---|---|
| 4,788,083 | 11/1988 | Damann et al. | 427/340 |
| 5,554,700 | 9/1996 | Schipfer et al. | 204/504 |
| 5,631,214 | 5/1997 | Karol et al. | 508/365 |
| 5,670,441 | 9/1997 | Foedde et al. | 502/200 |
| 5,859,165 | 1/1999 | Bossert et al. | 204/505 |

FOREIGN PATENT DOCUMENTS

| | | |
|---|---|---|
| 778855 | 2/1968 | (CA) . |
| 2041060 | 4/1991 | (CA) . |
| WO 96/20967 | 7/1966 | (WO) . |
| WO 93/24578 | 12/1993 | (WO) . |
| WO 95/08579 | 3/1995 | (WO) . |
| WO 95/29007 | 11/1995 | (WO) . |
| 93/2977 | 4/1993 | (ZA) . |

OTHER PUBLICATIONS

Robins, Janis, "Metal Ion Catalysis in Mercaptan Isocyanate Reactions", *Adv. Urethane Sci. Tech.*, vol. 12, pp. 25–58 (1993). No Month Available.

Agocs, Lisa et al., "Spectroscopic, Structural, and Mass Spectrometric Studies on Two Systematic Series of Dithiabismuth (III) Heterocycles: Identification of Bismuthenium Cations and Their Solvent Complexes", *J.Am. Chen Soc.*, vol. 118, 3225–3232 (1996). No Month Available.

J.V. Dubsky, A. Okac *Anal. Chem.* 1934, 96, 267. No Month Available.

*Primary Examiner*—Kishor Mayekar
(74) *Attorney, Agent, or Firm*—William J. Uhl; Deborah M. Altman

(57) ABSTRACT

A composition is provided comprising a reaction product of (1) a bismuth compound; and (2) an heterocyclic compound having mercapto functionality. Such compositions are useful in electrodepositable compositions further comprising an active hydrogen-containing, cationic salt group-containing resin and a capped polyisocyanate curing agent. These electrodepositable compositions may be prepared without the use of conventional lead or tin catalysts and exhibit excellent properties as cured coatings.

18 Claims, No Drawings

US 6,190,524 B1

ORGANOSULFUR BISMUTH COMPOUNDS AND THEIR USE IN ELECTRODEPOSITABLE COATING COMPOSITIONS

CROSS REFERENCE TO RELATED APPLICATION

Reference is made to related U.S. patent application Ser. No. 09/087,211, filed May 29, 1998 now U.S. Pat. No. 5,972,189.

FIELD OF THE INVENTION

The present invention relates to novel organosulfur bismuth compounds, cationic electrodepositable compositions containing organosulfur bismuth compounds as catalysts, and to the use of such cationic electrodepositable compositions in an electrodeposition process.

BACKGROUND OF THE INVENTION

The application of a coating by electrodeposition involves depositing a film-forming composition to an electrically conductive substrate under the influence of an applied electrical potential. Electrodeposition has gained prominence in the coatings industry because in comparison with non-electrophoretic coating methods, electrodeposition provides higher paint utilization, outstanding corrosion resistance, and low environmental contamination. Early attempts at commercial electrodeposition processes used anionic electrodeposition, where the workpiece being coated served as the anode. However, in 1972, cationic electrodeposition was introduced commercially. Since that time, cationic electrodeposition has become increasingly popular and today is the most prevalent method of electrodeposition. Throughout the world, more than 80 percent of all motor vehicles manufactured are given a primer coating by cationic electrodeposition.

Many cationic electrodeposition compositions used today are based on active hydrogen-containing resins derived from a polyepoxide and a capped polyisocyanate curing agent. These cationic electrodeposition compositions conventionally contain organotin catalysts such as dibutyl tin oxide and lead catalysts to activate cure of the electrodeposition composition. Because of cost and environmental considerations, the levels of these catalysts are kept low. However, low catalyst levels may lessen the cure response of a coating composition, providing weaker properties in the cured film than desired. Appearance of the cured film may also be adversely affected.

Schipfer et al. in South Africa Patent Application No. 93/2977 discloses the use of cationic electrodepositable coating compositions which contain catalysts that are salts of bismuth and carboxylic acids, in particular hydroxycarboxylic acids. The reference does not disclose the use of organosulfur bismuth compounds as catalysts in cationic electrodepositable compositions.

Karol et al. in U.S. Pat. No. 5,631,214 disclose the preparation of bismuth dialkyldithiocarbamates for use in lubricant compositions. The reference does not disclose organosulfur bismuth compounds of the type presently claimed, nor the use of such compounds as catalysts in cationic electrodepositable compositions.

Bismuth compounds such as bismuth hydroxy acids have been proposed as catalysts in aqueous electrodepositable compositions. See for example U.S. Pat. No. 5,670,441. However, such compounds are prone to hydrolysis, drastically lowering the pH of the electrodepositable composition making it more corrosive to iron pipes and pumps and yielding bismuth oxide which is insoluble and relatively ineffective as a catalyst.

Bossert et al. in U.S. Pat. No. 5,859,165 disclose the use of a metal catalyst in cationic electrocoating compositions. The metal catalyst is based on the reaction product of a metal, such as manganese, cobalt, zinc or bismuth, with a mercaptan or hydroxy mercaptan or an organic acid. Such catalysts are typically used in cationic electrocoating compositions in conjunction with organotin compounds, for example triorganotin compounds. Use of such metal catalysts is often avoided, however, due to the objectionable odor generated thereby.

It would be desirable to provide an electrodepositable composition which demonstrates acceptable cure response without loss of cured film properties or appearance and which contains catalysts that do not have the shortcomings of those of the prior art.

SUMMARY OF THE INVENTION

In accordance with the present invention, a composition is provided comprising a reaction product of (1) a bismuth compound; and (2) a heterocyclic compound having mercapto functionality. Also provided are an electrodepositable composition comprising the bismuth reaction products mentioned above in conjunction with (a) an active hydrogen-containing, cationic salt group-containing resin electrodepositable on a cathode and (b) a capped polyisocyanate curing agent; and to the use of these compounds in a method of electrodeposition using the electrodepositable composition. Pigment pastes containing the bismuth reaction products and a method of preparing these pastes are also provided.

It has been found that the above-described bismuth reaction products which comprise heterocyclic compounds containing mercapto functionality provide efficient catalytic activity (i.e., fast cure response at lower cure temperatures) when used in electrodepositable compositions with little or no objectionable odor.

Other than in the operating examples, or where otherwise indicated, all numbers expressing quantities of ingredients or reaction conditions used in the specification and claims are to be understood as modified in all instances by the term "about". As used herein, in the specification and the claims, the term "polymer" is meant to include oligomers.

DETAILED DESCRIPTION

The compositions of the present invention comprise a reaction product of (1) a bismuth compound; and (2) a heterocyclic compound having mercapto functionality. Preferably, a molar excess of mercapto groups in the heterocyclic compound of (2) to bismuth in the bismuth compound of (1) is used. Most preferably, the molar ratio of mercapto groups in the heterocyclic compound of (2) to bismuth in the bismuth compound of (1) 2:1 to 3:1.

Suitable bismuth compounds include bismuth oxide, bismuth metal and bismuth salts of organic or inorganic acids, such as bismuth nitrate pentahydrate, and the like.

The heterocyclic compounds that may be used to prepare the composition of the present invention may be aliphatic or aromatic, mono- or polycyclic. The heterocyclic compounds contain mercapto, i. e., thiol (—SH) functionality. The heterocyclic compounds also preferably contain azole, including diazole, functionality. Suitable heterocyclic compounds include, inter alia, 5-amino-1,3,4-thiadiazole-2-thiol, 5-methyl-1,3,4-thiadiazole-2-thiol, 2,5-dimercapto-1,3,4-thiadiazole. Other heterocyclic mercapto compounds can be used such as 2-mercaptobenzimidazole, 2-mercaptobenzothiazole, and dimercaptodiphenylsulfide.

The compositions of the present invention may be prepared by combining the reactants in an aqueous or organic medium (or mixed media such as water and alcohol) and stirring for thirty to 210 minutes. Reaction temperatures may range from ambient to about 65° C. The reaction product precipitates from the reaction medium and is then isolated and washed. Optionally, a catalytic amount of an acid can be used to facilitate solution of the bismuth compound. The preferred acid is sulfamic acid. The amount of the acid can range from 0.01 to 1.0, preferably 0.05 to 0.5 equivalents based on bismuth metal content.

The compositions of the present invention are useful as catalysts in cationic electrodepositable compositions, minimizing or even eliminating the need for lead- and tin-based catalysts conventionally used in such systems. Such electrodepositable compositions comprise (a) an active hydrogen-containing, cationic salt group-containing resin electrodepositable on a cathode; (b) a capped polyisocyanate curing agent; and (c) the bismuth compositions described above.

The cationic resin of component (a) may be any suitable cationic resin known to those skilled in the art. It is preferably derived from a polyepoxide, which may be chain extended by reacting together a polyepoxide and a polyhydroxyl group-containing material selected from alcoholic hydroxyl group-containing materials and phenolic hydroxyl group-containing materials to chain extend or build the molecular weight of the polyepoxide. Such chain extension reactions may be conducted under typical conditions as known to those skilled in the art. The resin contains cationic salt groups and active hydrogen groups selected from aliphatic hydroxyl and primary and secondary amino.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i. e., epoxy:polyhydroxyl group-containing material is typically from about 1.00:0.75 to 1.00:2.00.

The polyepoxide preferably has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and preferably about two; that is, polyepoxides which have on average two epoxide groups per molecule. The preferred polyepoxides are polyglycidyl ethers of cyclic polyols. Particularly preferred are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali, using reaction conditions typical for etherification as known to those skilled in the art. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexane diol and 1,2-bis(hydroxymethyl)cyclohexane. The preferred polyepoxides have molecular weights ranging from about 180 to 500, preferably from about 186 to 350. Epoxy group-containing acrylic polymers can also be used, but they are not preferred.

Examples of polyhydroxyl group-containing materials used to chain extend or increase the molecular weight of the polyepoxide (i. e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used. Bisphenol A is preferred.

Also suitable for use as the cationic resin of component (a) are those resins which are the reaction products of a polyepoxide with an oxygen-substituted diamine compound as described in U.S. Pat. No. 5,820,987 at column 2, line 47 to column 7, line 4, incorporated by reference herein.

The active hydrogen-containing cationic resin also contains cationic salt groups. The cationic salt groups are preferably incorporated into the resin by reacting the epoxy group-containing resinous reaction product prepared as described above with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines are preferred, and hydroxyl-containing amines are particularly preferred. Polyamines may be used but are not recommended because of a tendency to gel the resin.

Tertiary and secondary amines are preferred to primary amines because primary amines are polyfunctional with respect to epoxy groups and have a greater tendency to gel the reaction mixture. If polyamines or primary amines are used, they should be used in a substantial stoichiometric excess to the epoxy functionality in the polyepoxide so as to prevent gellation and the excess amine should be removed from the reaction mixture by vacuum stripping or other technique at the end of the reaction. The epoxy may be added to the amine to ensure excess amine.

Examples of hydroxyl-containing amines are alkanolamines, dialkanolamines, trialkanolamines, alkyl alkanolamines, and aralkyl alkanolamines containing from 1 to 18 carbon atoms, preferably 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine and N,N-dimethylcyclohexylamine.

Mixtures of the above mentioned amines may also be used.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50 to 150° C. may be done to hasten the reaction.

The reaction product of the primary and/or secondary amine and the polyepoxide is made cationic and water dispersible by at least partial neutralization with an acid. Suitable acids include organic and inorganic acids such as formic acid, acetic acid, lactic acid, dimethylolpropionic acid, phosphoric acid and sulfamic acid. Sulfamic acid is preferred. The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with a polyepoxide, the tertiary amine can be prereacted with the neutralizing acid to form the amine salt and then the amine salt reacted with the polyepoxide to form a quaternary salt group-containing resin. The reaction is conducted by mixing the amine salt with the polyepoxide in water. Typically the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of about 100° C. (at atmospheric pressure). At higher pressures, higher reaction temperatures may be used. Preferably the reaction temperature is in the range of about 60 to 100° C. Solvents such as a sterically hindered ester, ether, or sterically hindered ketone may be used, but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water.

In addition to resins containing amine salts and quaternary ammonium salt groups, cationic resins containing ternary sulfonium groups may be used in forming the active hydrogen-containing cationic resin in the composition of the present invention. Examples of these resins and their method of preparation are described in U.S. Pat. No. 3,793,278 to DeBona and U.S. Pat. No. 3,959,106 to Bosso et al.

The extent of cationic salt group formation should be such that when the resin is mixed with an aqueous medium and the other ingredients, a stable dispersion of the electrodepositable composition will form. By "stable dispersion" is meant one that does not settle or is easily redispersible if some settling occurs. Moreover, the dispersion should be of sufficient cationic character that the dispersed particles will migrate toward and electrodeposit on a cathode when an electrical potential is set up between an anode and a cathode immersed in the aqueous dispersion.

Generally, the active hydrogen-containing cationic resin of the electrodepositable composition of the present invention is non-gelled and contains from about 0.1 to 3.0, preferably from about 0.1 to 0.7 millequivalents of cationic salt group per gram of resin solids. The number average molecular weight of the active hydrogen-containing cationic resin preferably ranges from about 2,000 to about 15,000, more preferably from about 5,000 to about 10,000. By "non-gelled" is meant that the resin is substantially free from crosslinking, and prior to cationic salt group formation, the resin has a measurable intrinsic viscosity when dissolved in a suitable solvent. In contrast, a gelled resin, having an essentially infinite molecular weight, would have an intrinsic viscosity too high to measure.

The active hydrogens within the active hydrogen-containing cationic resin include any active hydrogens which are reactive with isocyanates within the temperature range of about 93 to 204° C., preferably about 120 to 177° C., as are known to those skilled in the art. Most often, the active hydrogens are selected from the group consisting of hydroxyl and primary and secondary amino, including mixed groups such as hydroxyl and primary amino. Preferably, the active hydrogen-containing cationic resin will have an active hydrogen content of about 1.7 to 10 millequivalents, more preferably about 2.0 to 5 millequivalents of active hydrogen per gram of resin solids.

Typically, the active hydrogen-containing cationic resin of component (a) is present in the electrodepositable composition in amounts of about 55 to about 75, preferably about 65 to about 70 percent by weight based on the total weight of (a) and the polyisocyanate curing agent of component (b).

The electrodepositable composition of the present invention also contains a capped polyisocyanate curing agent. The polyisocyanate curing agent of component (b) may be a fully capped polyisocyanate with substantially no free isocyanate groups, or it may be partially capped and reacted with the resin backbone as described in U.S. Pat. No. 3,984,299. The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Any suitable aliphatic, cycloaliphatic, or aromatic alkyl monoalcohol or phenolic compound may be used as a capping agent for the capped polyisocyanate curing agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols in which the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

Other suitable capping agents include oximes such as methyl ethyl ketoxime, acetone oxime, cyclohexanone oxime, lactams such as epsilon-caprolactam, amines such as dibutyl amine, and hydroxyalkyl phenols such as include 2-(2-hydroxyethoxy)phenol.

The capped polyisocyanate curing agent may be prepared by reacting the polyisocyanate with the capping agent using conditions and catalysts typically employed when reacting polyisocyanates with active hydrogen-containing materials.

The capped polyisocyanate curing agent of component (b) is typically present in the electrodepositable composition in amounts of about 25 to about 45, preferably about 30 to about 35 percent by weight based on the total weight of main vehicle resin solids. Typically there is sufficient polyisocyanate present in the composition of the present invention to provide about 0.1 to about 1.2 capped isocyanate groups for each active hydrogen in the cationic resin of component (a).

The catalyst of component (c) may be incorporated into the electrodepositable composition in several ways. It may be added as a dispersion to the final reaction mixture of the main vehicle; i. e., the active hydrogen-containing resin, just before solubilization with water and acid as described above. Alternatively, it may be added as a dispersion to a partially solubilized resin kept at sufficiently high solids so as to be sheared into the final composition. By "partially solubilized" is meant that the resin is fully neutralized with respect to acid functionality, but only partially water-thinned; i. e., diluted. Additionally, it may be co-dispersed with polyepoxide-polyoxyalkylene-polyamine modifying anti-crater resins such as those described in U.S. Pat. No. 4,423,166. It may also be dispersed in a conventional pigment grinding vehicle such as those disclosed in U.S. Pat. No. 4,007,154, by a grinding or milling process, and be a component of a pigment paste.

In a preferred embodiment of the invention, the catalyst is prepared in situ as a grind paste by dispersing the bismuth compound in a resinous vehicle containing groups which can be acidified to form cationic groups with water under agitation; acidifying the dispersion with an acid; and subsequently adding the mercapto group-containing heterocyclic compound and more water. The paste may then be ground as usual and added to the electrodepositable composition.

The above-described grind paste can further include pigments different from the bismuth compound. It may also be combined with other pigment paste dispersions, or included as an ingredient in a pigment paste formulation, which may then be subsequently ground using pigment grinding techniques known in the art.

Typically, the catalyst is present in the pigment paste (which includes all pigment paste components in the electrodepositable composition) in an amount ranging from 5 to 80 weight percent, preferably from 10 to 60 weight percent, and more preferably from 20 to 50 weight percent bismuth based on total weight of solids in the pigment paste.

The catalyst of component (c) is present in the electrodepositable composition of the present invention in amounts of about 0.5 to about 3.0 percent by weight, preferably about 1.0 to about 1.5 percent by weight bismuth based on the total weight of solids in the electrodepositable composition.

The composition of the present invention is preferably used in an electrodeposition process in the form of an aqueous dispersion. By "dispersion" is meant a two-phase transparent, translucent, or opaque aqueous resinous system in which the resin, curing agent, pigment, and water insoluble materials are the dispersed phase and water and water soluble materials comprise the continuous phase. The dispersion is a stable dispersion as defined earlier. The dispersed phase has an average particle size less than about 10 microns, preferably less than 5 microns. The aqueous dispersion preferably contains at least about 0.05 and usually about 0.05 to 50 percent by weight resin solids, depending on the particular end use of the dispersion.

The aqueous dispersion may optionally contain a coalescing solvent such as hydrocarbons, alcohols, esters, ethers and ketones. Examples of preferred coalescing solvents are alcohols, including polyols, such as isopropanol, butanol, 2-ethylhexanol, ethylene glycol and propylene glycol; ethers such as the monobutyl and monohexyl ethers of ethylene glycol; and ketones such as 4-methyl-2-pentanone (MIBK) and isophorone. The coalescing solvent is usually present in an amount up to about 40 percent by weight, preferably ranging from about 0.05 to 25 percent by weight based on total weight of the aqueous medium.

The electrodepositable composition of the present invention may further contain pigments and various other optional additives such as catalysts, plasticizers, surfactants, wetting agents, defoamers, and anti-cratering agents.

Examples of suitable surfactants and wetting agents include alkyl imidazolines such as those available from Geigy Industrial Chemicals as GEIGY AMINE C, and acetylenic alcohols available from Air Products and Chemicals as SURFYNOL. Examples of defoamers include a hydrocarbon containing inert diatomaceous earth available from Crucible Materials Corp. as FOAMKILL 63. Examples of anti-cratering agents are polyoxyalkylene-polyamine reaction products such as those described in U.S. Pat. No. 4,432,850. These optional ingredients, when present, are usually used in an amount up to 30 percent by weight, typically about 1 to 20 percent by weight based on weight of resin solids.

Suitable pigments include, for example, iron oxides, carbon black, coal dust, titanium dioxide, talc and barium sulfate. The pigment content of the aqueous dispersion, generally expressed as the pigment to resin (or binder) ratio (P/B) is usually about 0.1:1 to 1:1.

In the process of electrodeposition the aqueous dispersion is placed in contact with an electrically conductive anode and cathode. Upon passage of an electric current between the anode and cathode while they are in contact with the aqueous dispersion, an adherent film of the electrodepositable composition will deposit in a substantially continuous manner on the cathode. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film. Any electroconductive substrate, especially metal substrates such as steel, zinc, aluminum, copper, magnesium or the like can be coated with the electrodepositable composition of the present invention. Steel substrates are preferred because the composition provides significant corrosion protection to these substrates. Although it is conventional to pretreat the steel substrate with a phosphate conversion coating followed by a chromic acid rinse, the composition of the present invention may be applied to steel substrates which have not been given a chrome rinse and still provides excellent corrosion resistance.

After deposition, the coating is heated to cure the deposited composition. The heating or curing operation is usually carried out at a temperature in the range of from about 93 to about 204° C., preferably from about 120° C. to about 177° C. for a period of time ranging from 10 to 60 minutes. The thickness of the resultant film is usually from about 10 to 50 microns.

The composition can be applied by means other than electrodeposition including brushing, dipping, flow coating, spraying and the like, but it is most often applied by electrodeposition.

The invention will be further described by reference to the following examples. Unless otherwise indicated, all parts are by weight.

EXAMPLES

Examples A, B, C and D illustrate the preparation of reaction products according to the present invention.

TABLE 1

| Component | Weight in Grams | | | |
|---|---|---|---|---|
| Example | A | B | C | D |
| Bismuth Oxide $Bi_2O_3$[1] | 32.6 | 23.8 | | 18.6 |
| Bismuth (III) Nitrate Pentahydrate[1] | | | 82.6 | |
| Deionized Water | 500.0 | 500.0 | | 400.0 |
| Ethanol (denatured) | 70.0 | | 500.0 | 100.0 |
| Sulfamic Acid[1] | 1.0 | 1.0 | | 0.9 |
| 1,2-Ethanedithiol[1] | | | 15.3 | |
| 2-Mercaptobenzothiazole[1] | 46.8 | | | |
| 5-amino-1,3,4-thiadiazole-2-thiol[1] | | 40.3 | | |
| 2,5-dimercapto-1,3,4-thiadiazole[1] | | | 12.8 | |
| 5-methyl-1,3,4-thiadiazole-2-thiol[1] | | | | 31.8 |

[1]Available from Aldrich Chemical Company, Inc.

The reaction products were prepared as follows. The bismuth compound was combined with water or ethanol, or a mixture of the two, and the sulfamic acid (if present), in a 4-neck flask with stirring. The 1,2-ethanedithiol which is a liquid was added dropwise from an addition funnel. The mercapto compounds which are solids were either added directly to the flask or dissolved in warm ethanol (if soluble) and added via an addition funnel. The reaction mixture was then stirred for several hours at room temperature, or at elevated temperatures under 75° C. The precipitate formed was collected through vacuum filtration and the precipitate was washed twice with an excess of water, then ethanol and then acetone. The product was then dried under vacuum.

Examples A1 through G1 demonstrate dispersion of various pigments and/or bismuth complexes in a grind resin for use in cationic electrodepositable compositions. Examples A1 through D1, and F1 are in accordance with the present invention (note that F1, analogous to Example D, illustrates preparation of the reaction product in situ); Example E1 illustrates a pigment grind, and Example G1 (comparative) illustrates a dispersion of $Bi_2O_3$ in a cationic grind resin.

TABLE 2

| Component | Weight in Grams | | | | | | |
|---|---|---|---|---|---|---|---|
| Example | A1 | B1 | C1 | D1 | E1 | F1 | G1 |
| Cationic Grind Resin[1] | 88.4 | 85.7 | 94.6 | 62.5 | 437.8 | 218.8 | 89.3 |
| Example A | 49.5 | | | | | | |
| Example B | | 48.0 | | | | | |
| Example C | | | 53.0 | | | | |
| Example D | | | | 35.0 | | | |
| Bismuth Oxide $Bi_2O_3$ | | | | | | 54.9 | 50.0 |
| 5-methyl-1,3,4-thiadiazole-2-thiol | | | | | | 65.2 | |
| 10% Sulfamic Acid in Water | | | | | | 24.5 | |
| Carbon Black[2] | | | | | 250.0 | | |
| Deionized Water | 143.7 | 157.2 | 155.2 | 111.9 | 658.0 | 468.1 | 146.4 |

| Ingredient | Parts by Weight |
|---|---|
| EPON 828[a] | 710 |
| Bisphenol A | 289.6 |
| 2-ethylhexanol monourethane toluene diisocyanate in methyl isobutyl ketone | 406.4 |
| Quaternizing Agent[b] | 496.3 |
| Deionized Water | 71.2 |
| 2-butoxyethanol | 56.8 |

| Ingredient | Parts by Weight |
|---|---|
| 2-ethylhexanol monourethane toluene diisocyanate in methyl isobutyl ketone | 320 |
| Dimethylethanolamine | 87.2 |
| 88% aqueous lactic acid solution | 117.6 |
| 2-butoxyethanol | 39.2 |

[1]A cationic grind resin was prepared from the following ingredients:
[a]Epoxy resin solution commercially available from Shell Chemical Company.
[b]A quaternizing agent was prepared from a mixture of the following ingredients:
The 2-ethylhexanol monourethane toluene diisocyanate was added to the dimethylethanolamine in a suitable reaction vessel at room temperature. The mixture exothermed and was stirred for one hour at 80° C. Lactic acid was then charged followed by the addition of 2-butoxyethanol. The reaction mixture was stirred for about one hour at 65° C. to form the desired quaternizing agent.
[2]Available from Degussa Corporation as Printex 200

The dispersions were prepared as follows. The grinding resin was charged into a stainless steel vessel. The complex or pigment was then added under agitation with a Cowles blade and held for fifteen minutes. For Example F1, the bismuth oxide was added to the grind resin, under agitation, along with half of the deionized water; sulfamic acid was added followed by the methylthiadiazolethiol and the remaining water. Example E1 was charged into a sandmill and ground in the presence of ceramic media for one hour at 1750 rpm. All others were ground with ceramic media in a stainless steel beaker using an air motor and grind disk at approximately 2000 rpm for three hours. All grinds were cooled such that the temperature did not exceed 40° C.

Examples A2 through D2, F2 and G2 illustrate the preparation of cationic electrodepositable compositions. Example G2 is comparative, containing only $Bi_2O_3$ as a catalyst.

TABLE 3

| Component | Weight in Grams | | | | | |
|---|---|---|---|---|---|---|
| Example | A2 | B2 | C2 | D2 | F2 | G2 |
| Cationic Resin[3] | 803.3 | 917.2 | 978.7 | 960.2 | 1007.8 | 992.6 |
| Example A1 | 43.0 | | | | | |
| Example B1 | | 58.5 | | | | |
| Example C1 | | | 36.1 | | | |
| Example D1 | | | | 56.7 | | |
| Example E1 | 10.1 | 12.5 | 12.9 | 13.4 | 13.3 | 12.9 |
| Example F1 | | | | | 58.8 | |
| Example G1 | | | | | | 22.2 |
| Deionized Water | 1143.7 | 1311.7 | 1372.2 | 1369.7 | 1420.1 | 1372.2 |

[3]Available from PPG Industries, Inc. as E6244

Paints were prepared as follows. The cationic resin was charged into a one gallon container. The applicable bismuth dispersion of Examples A1 to D1, F1 and G1 was thoroughly blended with the pigment dispersion of Example E1. This blend was then added to the cationic resin under agitation. The deionized water was then added under agitation. Fifteen percent of the total paint weight was removed by standard ultrafiltration techniques and was replaced by an equal amount of deionized water.

The paints of Examples A2 through D2, F2 and G2 were electrodeposited onto phosphated cold rolled steel panels available from Advanced Coatings Technologies as B952 P60. Deposition was carried out under an applied DC voltage of 220 volts for two minutes at a paint temperature of 32° C. The film thickness ranged from 22 to 25 microns. The panels were then baked in an electric oven for thirty minutes at 320, 340, 360, 380, and 400° F. (160, 171.1, 182.2, 193.3, and 204.4° C., respectively).

The degree of completeness of the curing reaction was determined by rubbing the test panels with a rag soaked with acetone. Firm pressure is applied and one double-rub consists of one stroke back and forth across the panel. The panels were rated by the following scale, and results are shown in Table 4 below:

10 No Effect
9 Slight Mark
8 Mark
7 Dull
6 Soft
5 81–100 double rubs to Break Through
4 61–80 Break Through
3 41–60 Break Through
2 21–40 Break Through
1 10–20 Break Through
0 <10 Break Through

TABLE 4

| | 320° | 340° | 360° | 380° | 400° |
|---|---|---|---|---|---|
| Example A2 | 1 | 6 | 10 | 10 | 9 |
| Example B2 | 3 | 6 | 10 | 10 | 10 |
| Example C2 | 2 | 6 | 9 | 10 | 10 |
| Example D2 | 4 | 9 | 10 | 10 | 9 |
| Example F2 | 6 | 9 | 10 | 10 | 9 |

TABLE 4-continued

| | 320° | 340° | 360° | 380° | 400° |
|---|---|---|---|---|---|
| Example G2 (Comparative) | 0 | 0 | 1 | 3 | 9 |

The data shown in Table 4 indicate that compositions of the present invention are effective as cure catalysts in cationic electrodepositable compositions at cure temperatures as low as 340° F., and particularly at cure temperatures of at least 360° F.

We claim:

1. An electrodepositable composition comprising:
   (a) an active hydrogen-containing, cationic salt group-containing resin electrodepositable on a cathode;
   (b) a capped polyisocyanate curing agent; and
   (c) a catalyst composition comprising a reaction product of
       (1) a bismuth compound; and
       (2) a heterocyclic compound having mercapto functionality.

2. The electrodepositable composition of claim 1 wherein the active hydrogen-containing, cationic salt group-containing resin is derived from a polyepoxide.

3. The electrodepositable composition of claim 1 wherein the cationic salt groups are amine salt groups.

4. The electrodepositable composition of claim 1 wherein the heterocyclic compound containing mercapto functionality (2) is selected from the group consisting of alkyl mercapto thiadiazoles and amino mercapto thiadiazoles.

5. The electrodepositable composition of claim 4 wherein the heterocyclic compound is selected from the group consisting of 5-methyl-1,3,4-thiadiazole-2-thiol and 5-amino-1,3,4-thiadiazole-2-thiol.

6. The electrodepositable composition of claim 1 wherein the active hydrogen-containing, cationic salt group-containing resin is present in amounts of 55 to 75 percent by weight, based on the total solids content of (a) and (b).

7. The electrodepositable composition of claim 1 wherein the capped polyisocyanate curing agent is present in amounts of 25 to 45 percent by weight, based on the total solids content of (a) and (b).

8. The electrodepositable composition of claim 1 wherein the catalyst composition (c) is present in the electrodepositable composition in an amount ranging from 0.5 to 3.0 percent by weight bismuth based on the total weight of solids in the electrodepositable composition.

9. The electrodepositable composition of claim 1 which is curable at a temperature range of 120 to 177° C.

10. A method of electrocoating an electroconductive substrate which serves as a cathode in an electrical circuit comprising the cathode and an anode immersed in an aqueous electrodepositable composition containing a cationic water dispersible resin, said method comprising passing an electric current between the anode and the cathode to cause the electrodepositable composition to deposit on the cathode as a substantially continuous film, and heating the electrodeposited film at an elevated temperature to cure the film, wherein the electrodepositable composition comprises:
   (a) an active hydrogen-containing, cationic salt group-containing resin electrodepositable on a cathode;
   (b) a capped polyisocyanate curing agent; and
   (c) a catalyst composition comprising a reaction product of (1) a bismuth compound; and
(2) a heterocyclic compound having mercapto functionality.

11. The method of claim 10 wherein the active hydrogen-containing, cationic salt group-containing resin is derived from a polyepoxide.

12. The method of claim 10 wherein the cationic salt groups are amine salt groups.

13. The method of claim 10 wherein the heterocyclic compound having mercapto functionality is selected from the group consisting of alkyl mercapto thiadiazoles and amino mercapto thiadiazoles.

14. The method of claim 13 wherein the heterocyclic compound having mercapto functionality is selected from the group consisting of 5-amino-1,3,4-thiadiazole-2-thiol and 5-methyl-1,3,4-thiadiazole-2-thiol.

15. The method of claim 10 wherein the active hydrogen-containing, cationic salt group-containing resin is present in the electrodepositable composition in amounts of 55 to 75 percent by weight, based on the total solids content of (a) and (b).

16. The method of claim 10 wherein the capped polyisocyanate curing agent is present in the electrodepositable composition in amounts of 25 to 45 percent by weight, based on the total solids content of (a) and (b).

17. The method of claim 10 wherein the catalyst composition of (c) is present in the electrodepositable composition in an amount ranging from 0.5 to 3.0 percent by weight bismuth based on the total weight of solids in the electrodepositable composition.

18. The method of claim 10 wherein the heating of the electrodeposited film is done at a temperature range of 120 to 177° C.

* * * * *